(12) United States Patent
Numai

(10) Patent No.: US 6,603,113 B2
(45) Date of Patent: Aug. 5, 2003

(54) GYRO COMPRISING A RING LASER IN WHICH BEAMS OF DIFFERENT OSCILLATION FREQUENCIES COEXIST AND PROPAGATE IN MUTUALLY OPPOSITE CIRCULATION DIRECTIONS, DRIVING METHOD OF GYRO, AND SIGNAL DETECTING METHOD

(75) Inventor: Takahiro Numai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/897,932

(22) Filed: Jul. 5, 2001

(65) Prior Publication Data

US 2002/0033948 A1 Mar. 21, 2002

(30) Foreign Application Priority Data

Jul. 11, 2000 (JP) ........................................ 2000-210065

(51) Int. Cl.⁷ .................................................. G01J 4/00
(52) U.S. Cl. .................................. 250/227.19; 356/459
(58) Field of Search ........................... 250/216, 227.11, 250/227.19, 227.27; 356/459, 461, 472, 474, 475; 372/94, 64, 108

(56) References Cited

U.S. PATENT DOCUMENTS

| 4,431,308 A | 2/1984 | Mitsuhashi et al. ......... 356/350 |
| 4,913,548 A | 4/1990 | Vick ........................... 356/350 |
| 5,112,128 A | * 5/1992 | SooHoo et al. ............. 356/470 |
| 5,764,681 A | 6/1998 | Ballantyne et al. ........... 372/94 |

FOREIGN PATENT DOCUMENTS

| JP | 57-43486 | 3/1982 |
| JP | 4-174317 | 6/1992 |
| JP | 5-288556 | 11/1993 |

* cited by examiner

*Primary Examiner*—Que T. Le
(74) *Attorney, Agent, or Firm*—Fitzpatrick, Cella, Harper & Scinto (57) ABSTRACT

A gyro apparatus has a ring laser in which laser beams of different oscillation frequencies coexist and propagate in mutually opposite circulation directions in an optical resonator, a power source of driving for the ring laser, a device for measuring a difference between the oscillation frequencies of the laser beams, and a device for controlling the power source of driving according to the frequency difference.

15 Claims, 9 Drawing Sheets

GYRO COMPRISING A RING LASER IN WHICH BEAMS OF DIFFERENT OSCILLATION FREQUENCIES COEXIST AND PROPAGATE IN MUTUALLY OPPOSITE CIRCULATION DIRECTIONS, DRIVING METHOD OF GYRO, AND SIGNAL DETECTING METHOD

BACKGROUND OF THE INVENTION

1. Field of the Invention

The present invention relates to optical gyros for detecting rotation and, more particularly, to optical gyros of the ring laser type.

2. Related Background Art

The conventionally well-known gyros for detecting the angular velocity of a moving object include mechanical gyros having a rotor and an oscillator, and optical gyros. In particular the optical gyros have the feasibility of instantaneous activation and wide dynamic ranges and thus are bringing about innovation in the technical fields of gyros. The optical gyros embrace ring laser gyros, optical fiber gyros, passive ring resonator gyros, and so on. Among these, the pioneer gyros were the ring laser gyros using gas lasers, which have already been used in practice, e.g., in airplanes. Semiconductor laser gyros as integrated on a semiconductor substrate have been also proposed recently as compact, highly accurate ring laser gyros; for example, as described in Japanese Patent Application Laid-Open No. 5-288556.

There is also a technique of letting a clockwise laser beam and a counterclockwise laser beam travel in a semiconductor ring laser and detecting the angular velocity by making use of the difference between frequencies of the two laser beams (e.g., as described in Japanese Patent Application Laid-Open No. 57-43486 or U.S. Pat. No. 4,431,308).

Specifically, the angular velocity is determined from a change in the frequency (beat signal) of terminal voltage of the laser element.

However, the laser element is sensitive to noise included in the driving source and external environment and involved the problem that the beat signal was unstable at a standstill.

It is thus an object of the present invention to provide ring laser gyros that can detect the beat signal accurately and stably.

SUMMARY OF THE INVENTION

For accomplishing the above object, a gyro according to the present invention comprises a ring laser in which laser beams of different oscillation frequencies coexist and propagate in mutually opposite circulation directions in an optical resonator, a power source of driving for the ring laser, a device for measuring a difference between the oscillation frequencies of the laser beams, and a device for controlling the power source of driving according to the frequency difference.

The foregoing ring laser is, for example, a ring laser provided with an optical waveguide having an asymmetric taper shape. The control of the power source of driving is performed so that a beat signal detected from the ring laser becomes constant.

Another gyro according to the present invention is a gyro comprising a semiconductor ring laser permitting detection of a beat signal at a standstill, the gyro further comprising a power source of driving and a control device for effecting feedback control on the power source of driving for the semiconductor ring laser so that the beat signal at a standstill becomes stable.

Another gyro according to the present invention is a gyro comprising a semiconductor ring laser permitting detection of a beat signal at a standstill, wherein feedback control is effected on a power source of driving so as to cancel out a change in the beat signal due to rotation of the gyro and wherein an angular velocity is detected from a feedback signal used in the feedback control.

DETAILED DESCRIPTION OF THE PREFERRED EMBODIMENTS

Prior to the description of the embodiments of the invention, the principle of detection of angular velocity will be described.

In the ring laser, let $\lambda_1$ be the wavelength of the first laser beam circulating clockwise and $\lambda_2$ ($<\lambda_1$) be the wavelength of the second laser beam circulating counterclockwise. When the ring laser is rotated clockwise, the oscillation frequency $f_1$ of the first laser beam traveling clockwise exhibits a decrease defined below, as compared with the oscillation frequency $f_{10}$ in a non-rotating state.

$$\Delta f_1 = (2S_1/\lambda_1 L_1)\Omega \tag{1}$$

In this equation, $S_1$ represents a closed area surrounded by the optical path of the first laser beam, $L_1$ an optical pathlength of the first laser beam, and $\Omega$ the angular velocity of rotation. On the other hand, the oscillation frequency $f_2$ of the second laser beam traveling counterclockwise demonstrates an increase defined below, as compared with the oscillation frequency $f_{20}$ in the non-rotating state.

$$\Delta f_2 = (2S_2/\lambda_2 L_2)\Omega \tag{2}$$

In this equation, $S_2$ represents a closed area surrounded by the optical path of the second laser beam and $L_2$ the optical pathlength of the second laser beam. At this time, the first laser beam and the second laser beam coexist in the ring laser. Accordingly, there appears beat light having a frequency equal to the difference between the oscillation frequencies of the first laser beam and the second laser beam, i.e., the frequency given by Eq (3) below, in the ring laser. On the other hand, when the ring laser rotates counterclockwise, there appears beat light having the frequency given by Eq (4) below.

$$f_2 - f_1 = (f_{20} + \Delta f_2) - (f_{10} - \Delta f_1) \quad (3)$$
$$= f_{20} - f_{10} + \{(2S_2/\lambda_2 L_2)\Omega + (2S_1/\lambda_1 L_1)\Omega\}$$

$$f_2 - f_1 = (f_{20} - \Delta f_2) - (f_{10} + \Delta f_1) \quad (4)$$
$$= f_{20} - f_{10} - \{(2S_2/\lambda_2 L_2)\Omega + (2S_1/\lambda_1 L)\Omega\}$$

When there exist two or more oscillation modes in the ring laser, the population inversion exhibits temporal variation according to the difference between oscillation frequencies of the modes, which is referred to as the pulsation of population inversion. In the case of current injection lasers such as gas lasers and semiconductor lasers, the population inversion and the impedance of laser are in 1:1 correspondence. When the beams interfere with each other in the laser, the population inversion varies according thereto, so that the impedance varies between the electrodes of the laser. When the power source of driving is a constant voltage source, this variation appears as a change in terminal current. When the driving power source is a constant current source, the interference of light can be extracted as a signal indicating a change in terminal voltage. Of course, the impedance change can also be measured directly by an impedance meter. Accordingly, the change in current, voltage, or impedance of the ring laser can be used as a beat signal according to the rotation.

It can also be contemplated as a matter of course that the laser beams propagating in mutually opposite circulation directions in the resonator of the ring laser are emitted outward and simultaneously incident upon a photodetector and the beat signal is extracted from the photodetector.

It is preferable in terms of decrease of noise to use both the signal of the current, voltage, or impedance change of the ring laser and the signal from the photodetector as beat signals and perform statistical processing to calculate an average, a difference, and so on.

The beat frequency increases or decreases according to the direction of the rotation, as seen from Eqs (3) and (4). Therefore, the direction of rotation can be detected by measuring the increase or decrease in the beat frequency from that in the non-rotating state. The direction of rotation can be detected when the difference between oscillation frequencies satisfies the following condition.

$$f_2 - f_1 \geq 0 \quad (5)$$

If the oscillation wavelengths of the first laser beam and the second laser beam are equal to each other, the following relation holds.

$$f_{20} - f_{10} = 0 \quad (6)$$

Thus the beat frequency $f_2 - f_1$ can take positive and negative values. If absolute values of positive and negative beat frequencies should be equal the same signal would merely be detected in such cases. This does not allow the detection of the rotation direction. In contrast with it, it becomes feasible to detect the rotation direction, by employing a configuration wherein the sign of the beat signal is always the same (note that the description will be given by setting the sign positive) and only the absolute value thereof varies depending upon the direction of rotation.

The oscillation frequencies of the laser beams propagating as circulating in the mutually opposite rotation directions in the ring laser can be changed by making a difference between optical intensities of the respective laser beams. The reason is as follows. It is known that under coexistence of the laser beams of two modes the following relations hold between the oscillation frequency $f_i$ and photon densities $S_i$ (i=1, 2).

$$2\pi f_1 + \Phi_1 = \Omega_1 + \sigma_1 - \rho_1 S_1 - \tau_{12} S_2 \quad (7)$$

$$2\pi f_2 + \Phi_2 = \Omega_2 + \sigma_2 - \rho_2 S_2 - \tau_{21} S_1 \quad (8)$$

In these equations, $\Phi_i$ represents the phase, $\Omega_i$ the angular resonance frequency, $\sigma_i$ the mode pulling coefficient, $\rho_i$ the self-mode pushing coefficient, and $\tau_{ij}$ the cross-mode pushing coefficient. However, i, j=1, 2; i≠j herein. When the intensities of the laser beams of the two modes are different, i.e., when the photon densities $S_1 \neq S_2$, a difference can be made between the oscillation frequencies, according to Eqs. (7) and (8).

The difference can be made between the intensities of the laser beams propagating as circulating in the mutually opposite directions, by causing a loss only in the beam propagating as circulating in one rotation direction. For example, a taper portion of asymmetric shape is placed in part of an optical waveguide whereby the total reflection condition differs for light incident upon the taper portion. For this reason, there occurs a mirror loss of the light incident upon the taper portion. Since angles of incidence to the taper portion are different depending upon the light circulating directions, it is possible to cause a large loss in the laser beam circulating in a certain direction and a small loss in the light circulating in the opposite direction thereto. Alternatively, it is also possible to employ a configuration in which an optical element for making the light intensity difference between the laser beams propagating in the mutually opposite circulation directions is interposed at least in part of the optical waveguide.

The gyro described above generates the beat signal at a standstill and during rotation. The beat frequency of this signal can be converted to voltage output by supplying the beat signal into a frequency-voltage converter. A frequency counter may also be used instead of the frequency-voltage converter. Since the beat frequency includes the component proportional to the angular velocity of rotation, as also described previously, the output from the converter or the frequency counter can be reduced to the angular velocity if a relation of rotational velocity with the output from the frequency-voltage converter or the frequency counter is preliminarily determined.

Since the beat frequency is used for detecting the angular velocity of rotation and the direction of rotation, it is important to reduce fluctuations of the beat frequency at a standstill. As described heretofore, the beat frequency is dependent upon the difference between the intensities of the laser beams circulating in the mutually opposite directions. For this reason, fluctuations of the intensities of the laser beams lead to fluctuations of the oscillation frequencies. This results in fluctuations of the beat frequency being the difference between the oscillation frequencies. This can be prevented by reducing the fluctuations of the intensities of the laser beams. In the current injection lasers, the intensity of laser light increases approximately in proportion to $I-I_{th}$. Here I represents the injection current and $I_{th}$ the threshold current. The nonlinear effects such as gain saturation and the like account for deviation of the relation between the intensity of laser light and $I-I_{th}$ from linearity. Further, in the case of the semiconductor lasers, the deviation from linearity is also affected by a shift between a gain peak and a resonance peak, an overflow of carriers, intervalence band absorption, the Auger effect, and so on. Even with the deviation from linearity, however, the intensity of laser light can be controlled by the injection current and it is thus feasible to control the oscillation frequency by the injection current. As the difference increases between the intensities of the laser beams, the difference between the oscillation frequencies, i.e., the beat frequency becomes large. Then the present invention is characterized in that in order to suppress the increase in the beat frequency at a standstill, feedback is effected so as to decrease the injection current and if the difference between the intensities of laser beams becomes small on the other hand feedback is effected so as to increase the injection current. It is needless to mention that a voltage source, as well as a current source, may be used as a power source of driving, for accomplishing these objects.

For suppressing the fluctuations of the oscillation frequencies, it is necessary to supply a feedback signal for control of the power source of driving. An output current or an output voltage from the power source of driving is modulated according to this feedback signal.

If the feedback is also effected so as to keep the beat frequency constant with the gyro under rotation, the feedback signal and the output current or the output voltage from the power source of driving will include the information about the angular velocity of rotation. Accordingly, the rotation direction and the angular velocity may be determined from the feedback signal and the output current or the output voltage from the power source of driving. Particularly, when these signals are larger than the output from the terminals of the gyro or from the photodetector, the load can be lighter on the amplitude or there is no need for use of the amplifier, which is preferable. Further, signal/noise ratios can be improved by carrying out the statistical processing to calculate an average (including a weighted average), a difference, etc., using at least two signals selected from the feedback signal, the output current or the output voltage from the power source of driving, and the output from the terminals of the gyro and/or from the photodetector.

Embodiments of the present invention will be described hereinafter with reference to the drawings.

(First Embodiment)

Figure 1:
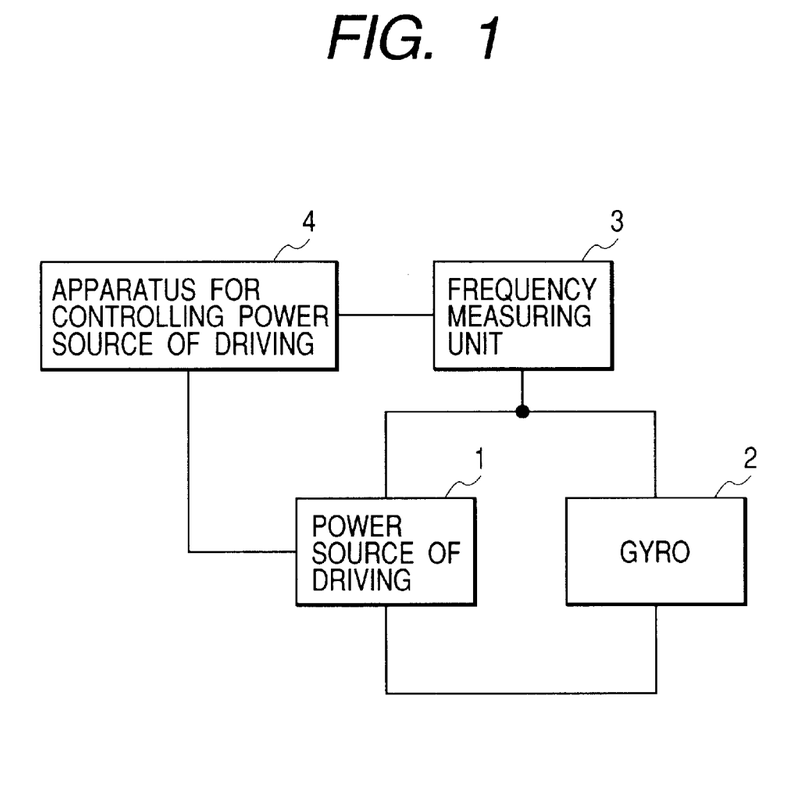
FIG. 1 is a drawing for explaining a gyro according to the first embodiment of the present invention.

FIG. 1 is a drawing illustrating the feature of the present invention best, in which reference numeral 1 designates a power source of driving, 2 a gyro, 3 a frequency measuring unit, and 4 an apparatus for controlling the power source of driving.

In the above structure, a ring laser gyro is used as the gyro 2. When a constant voltage source is used as the power source of driving 1, the beat signal appears as a change in terminal current. When a constant current source is used, the beat signal can be taken out as a change in terminal voltage. Of course, the beat signal can be obtained by directly measuring a change in impedance by an impedance meter. The frequency of this beat signal is detected by the frequency measuring unit 3. The resultant signal according to the beat frequency is entered into the apparatus 4 for controlling the power source of driving. Finally, the signal is sent from the control apparatus 4 to the driving power source 1 to stabilize the beat frequency at a standstill.

Figure 2A:
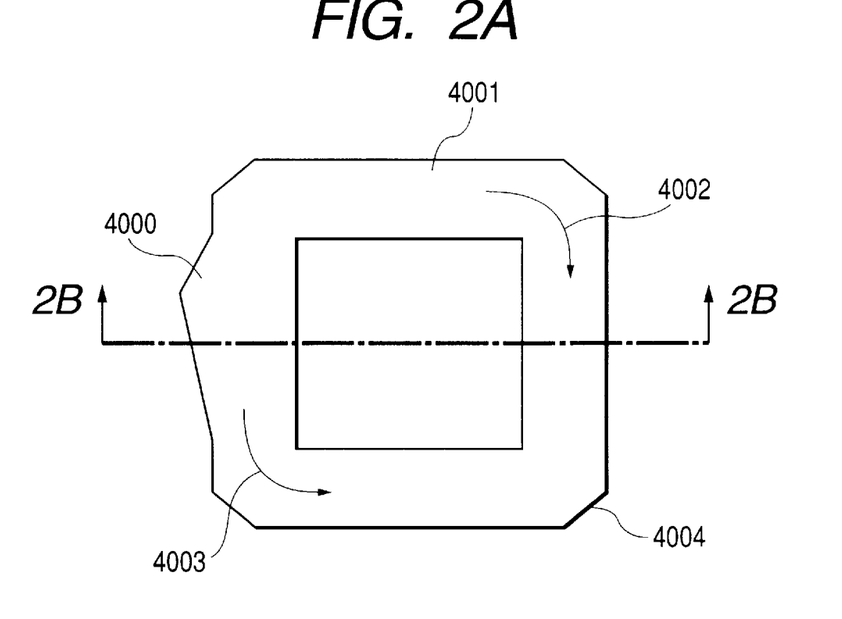
FIGS. 2A and 2B are drawings for explaining the gyro according to the first embodiment of the present invention.
Figure 2B:
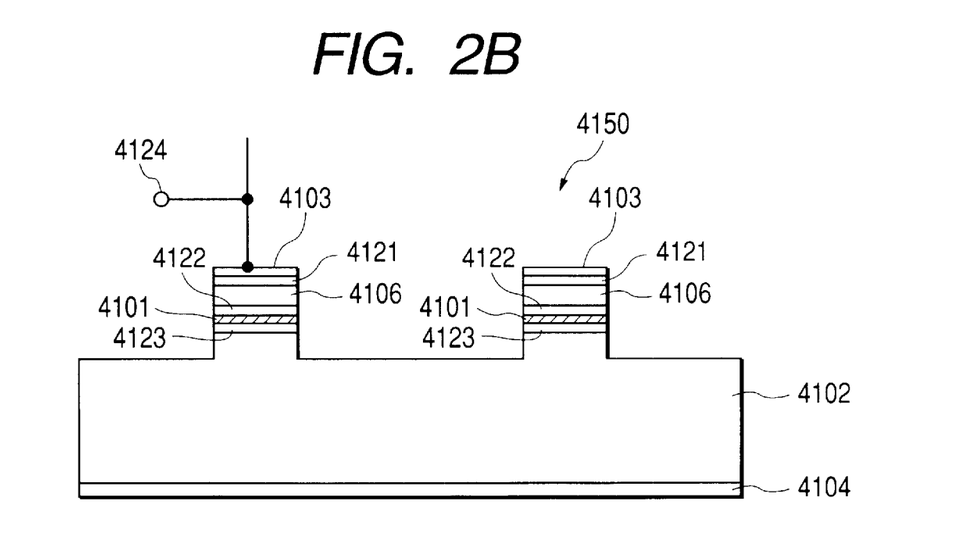

First described is an example in which a semiconductor ring laser gyro is used as the gyro 2. FIGS. 2A and 2B are drawings schematically showing the semiconductor ring laser gyro, in which reference numeral 4000 denotes an asymmetric taper portion of an optical waveguide, 4001 an optical waveguide of the semiconductor ring laser gyro, 4002 a clockwise laser beam, 4003 a counterclockwise laser beam, 4004 an end facet, 4101 an active layer, 4102 a semiconductor substrate, 4103 an anode, 4104 a cathode, 4106 a cladding layer, 4121 a cap layer, 4122 and 4123 light guiding layers, 4124 an electric terminal, and 4150 the semiconductor ring laser gyro. FIG. 2A is a top plan view of the gyro and FIG. 2B a cross-sectional view of the gyro cut along 2B—2B in FIG. 2A.

A method of fabricating the gyro in the above structure will be described. First grown on an n-InP substrate 4102 (350 µm thick) by organometallic vapor phase epitaxy are an undoped InGaAsP guiding layer 4123 with a bandgap wavelength of 1.3 µm (in the thickness of 0.15 µm), an undoped InGaAsP active layer 4101 with a bandgap wavelength of 1.55 µm (in the thickness of 0.1 µm), an undoped InGaAsP guiding layer 4122 with a bandgap wavelength of 1.3 µm (in the thickness of 0.15 µm), a p-InP cladding layer 4106 (in the thickness of 2 µm), and a p-InGaAsP cap layer 4121 with a bandgap wavelength of 1.4 µm (in the thickness of 0.3 µm), which constitute the semiconductor ring laser gyro 4150. After the epitaxy, a photoresist AZ-1350 (available from Hoechst) is applied up to the thickness of 1 µm on the p-InGaAsP cap layer 4121 with a spin coater. After prebaked at 80° C. for 30 minutes, the wafer is exposed with a mask thereon. After development and a rinse, the optical waveguide has the width of 5 µm and the taper portion 4000 includes the optical waveguide having the maximum width of 8 µm and the minimum width of 5 µm. The length of one round in the optical waveguide is 600 µm. After this, the wafer is guided into a reactive ion etching system to be etched into the depth of 3 µm with chlorine gas. Lastly, Cr/Au is evaporated on the p-InGaAsP cap layer 4121 to form the anode 4103. Further, AuGe/Ni/Au is evaporated to form the cathode 4104 on the n-InP substrate 4102. After that, it is annealed in a hydrogen atmosphere to realize the ohmic contact.

In the above structure, since the semiconductors and the air have their respective indexes of refraction different from each other, reflection occurs at the interface between them. Supposing the refractive index of the semiconductors is 3.5, total reflection takes place at angles of not less than 16.6° between laser light and a normal to the interface. Since a mode undergoing total reflection has a threshold current a mirror loss smaller than the other modes, oscillation starts at a lower injection current level. In addition, since the gain is concentrated on this oscillation mode, oscillation of the other modes is suppressed. In FIG. 2A, angles between the laser beams and normals to the interface are 45 degrees, which satisfies the total reflection condition. The threshold current at room temperature is 3.5 mA for the laser beam 4002 and 3 mA for the laser beam 4003.

Figure 3:
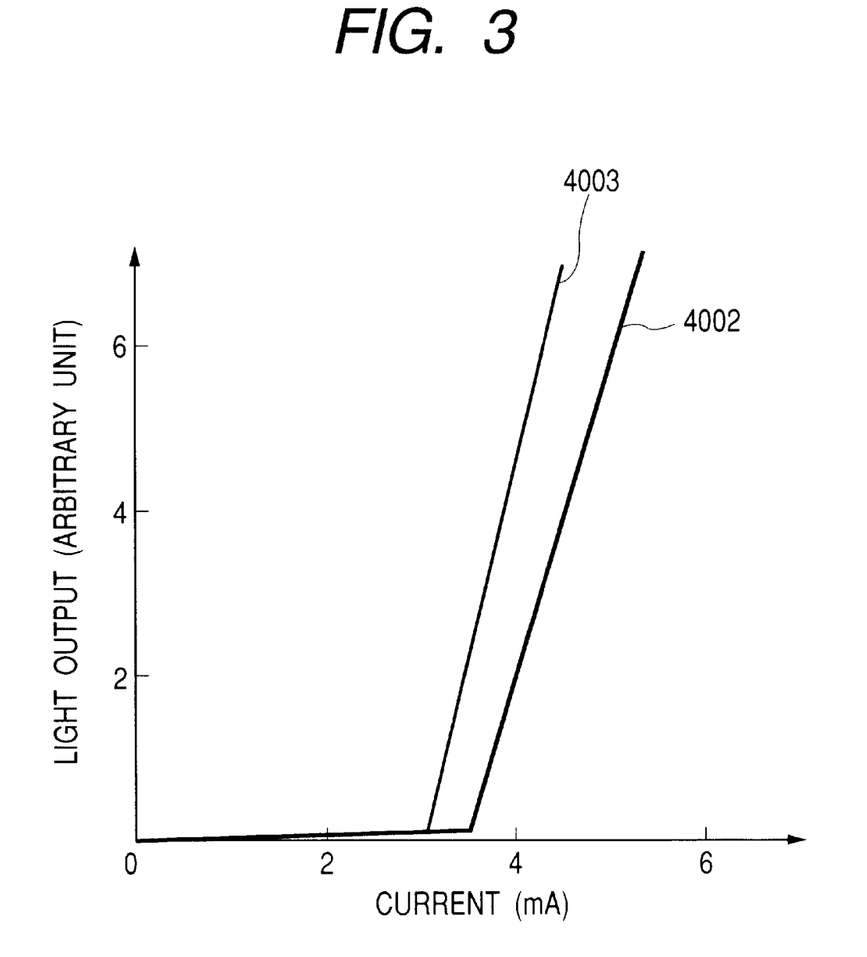
FIG. 3 is a drawing for explaining current-light output characteristics of the gyro according to the first embodiment of the present invention.

FIG. 3 is a drawing showing the current-light output characteristics at room temperature of a ring laser and shows a state of the above.

The driving current of the semiconductor ring laser gyro 4150 is 4.5 mA, the oscillation wavelengths of the laser beam 4002 and the laser beam 4003 are approximately equal to each other with the laser being at a standstill, and the oscillation wavelength λ is 1.55 µm. However, since the threshold current for the laser beam 4003 is smaller than the threshold current for the laser beam 4002, the intensity of the laser beam 4003 is larger than that of the laser beam 4002 as shown in FIG. 3. For this reason, there is a small difference between their oscillation frequencies; the oscillation frequency $f_3$ of the laser beam 4003 is 20 kHz larger than the oscillation frequency $f_4$ of the laser beam 4002. Then the laser beams 4002 and 4003 interfere with each other in the semiconductor ring laser gyro 4150. At this time, the power-source current is controlled at a constant level and the voltage is monitored between the electrode terminal 4124 and the cathode 4104, whereupon a signal having the amplitude of 100 mV and the frequency of 20 kHz is obtained.

Figure 4A:
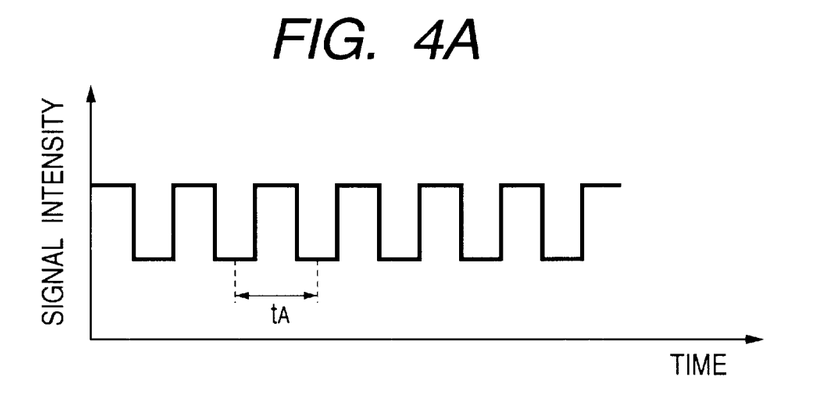
FIGS. 4A, 4B and 4C are drawings for explaining beat signals in the gyro according to the first embodiment of the present invention.

This state is shown in FIG. 4A. This shows that the beat frequency can be detected even while the semiconductor ring laser gyro 4150 is at a standstill.

Figure 4B:
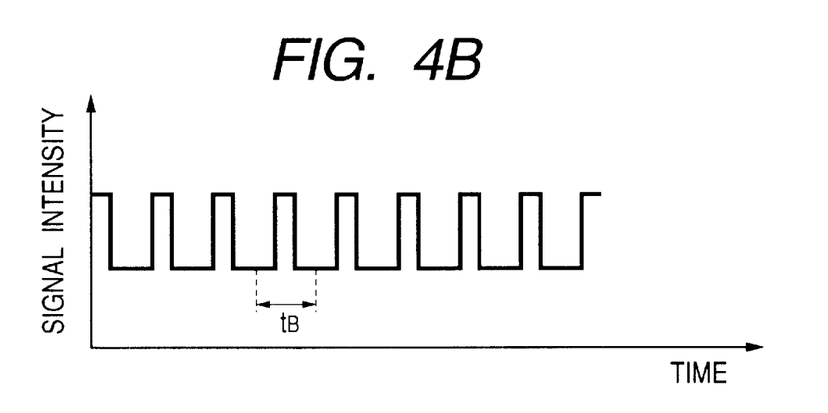

Suppose the semiconductor ring laser gyro 4150 is subjected to clockwise rotation at the rate of 30 degrees per second, which is close to hand shakes of cameras and vibration of cars. Then the oscillation frequency $f_3$ of the counterclockwise laser beam 4003 increases by 88.7 Hz. On the other hand, the oscillation frequency $f_4$ of the clockwise laser beam 4002 decreases by 88.7 Hz. Therefore, the beat frequency turns as follows.

$$f_3 - f_4 = 20 \text{ kHz} + 177.4 \text{ Hz} \tag{9}$$

This state is shown in FIG. 4B.

Figure 4C:
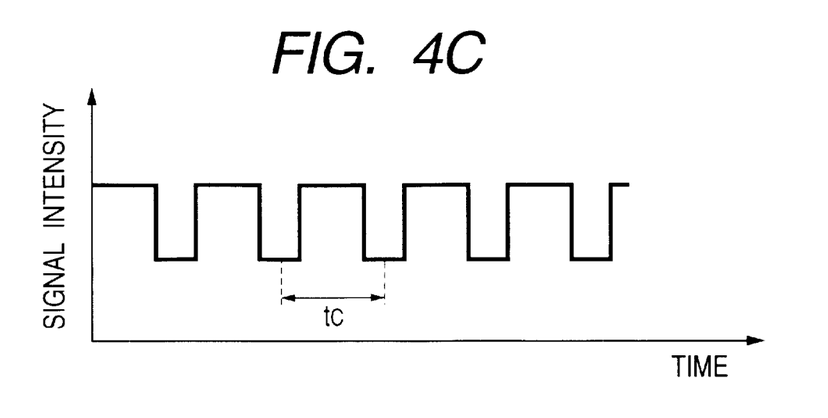

If the semiconductor ring laser gyro 4150 is subjected to counterclockwise rotation at the rate of 30 degrees per second on the other hand, the beat frequency turns as follows.

$$f_3 - f_4 = 20 \text{ kHz} - 177.4 \text{ Hz} \tag{10}$$

This state is shown in FIG. 4C.

It is feasible to detect the rotational velocity, because the absolute value of the increase/decrease in the beat frequency is proportional to the rotational velocity, and it is also feasible to detect the direction of rotation, because the rotation direction and the increase/decrease in the beat frequency are in 1:1 correspondence.

Although the present embodiment was configured to use the constant current driving and measure the change in terminal voltage, it is also possible to detect a change in current flowing at the terminals if constant voltage driving is employed. It is also possible to directly detect a change in impedance by an impedance meter.

Figure 5A:
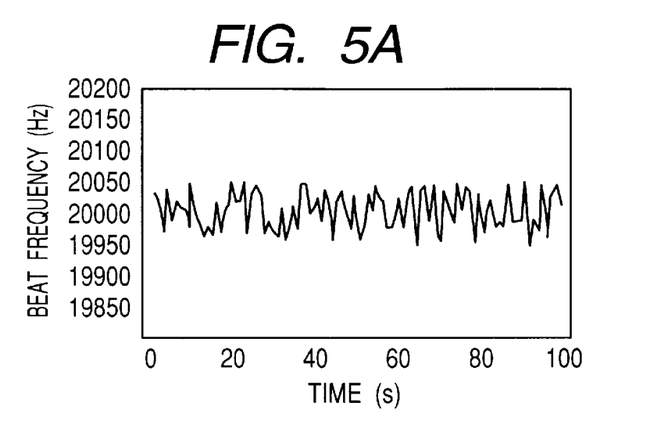
FIGS. 5A, 5B and 5C are drawings for explaining fluctuations of beat signals in the gyro according to the first embodiment of the present invention.

Although it was described heretofore that the beat frequency at a standstill was 20 kHz, the beat frequency at a standstill demonstrates fluctuations of ±50 Hz in an off state of the control apparatus 4, as shown in FIG. 5A.

Figure 5B:
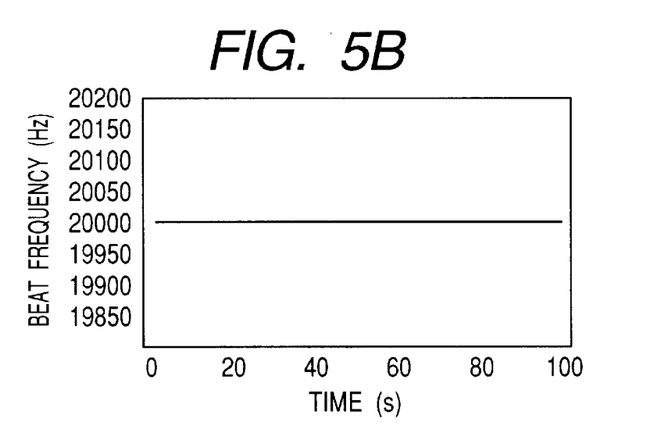

In contrast with it, where the power source 1 is controlled by the control apparatus 4, based on the measurement of the beat frequency, as in the present invention, the beat frequency becomes stabilized as shown in FIG. 5B.

Figure 5C:
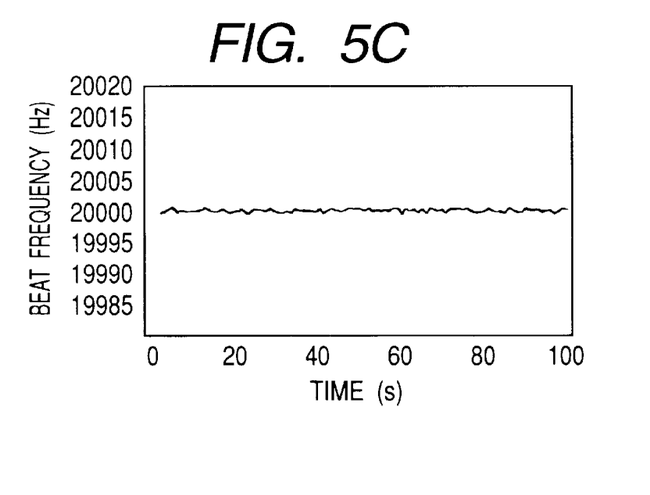

FIG. 5C shows a spectrum on a scale enlarged from the ordinate of FIG. 5B and it is seen therefrom that the frequency fluctuations are controlled to below ±1 Hz.

Although the terminal voltage was used as the beat signal herein, the signal for detection of angular velocity can also be either of the output signal from the control apparatus 4 and the output current or the output voltage from the power source of driving, which include the information of the beat signal. It is also preferable in terms of improvement in signal/noise ratios to perform the statistical processing to calculate an average (including a weighted average), a difference, etc., using at least two signals selected from those signals.

Although the semiconductor materials used herein were the InGaAsP based materials, they can be any semiconductor materials such as GaAs based, ZnSe based, InGaN based, AlGaN based, and other materials. The shape surrounded by the optical path of the optical waveguide does not always have to be rectangular as shown in FIG. 2A, but may also be any shape such as a hexagon, a triangle, a circle, or the like.

Figure 6:
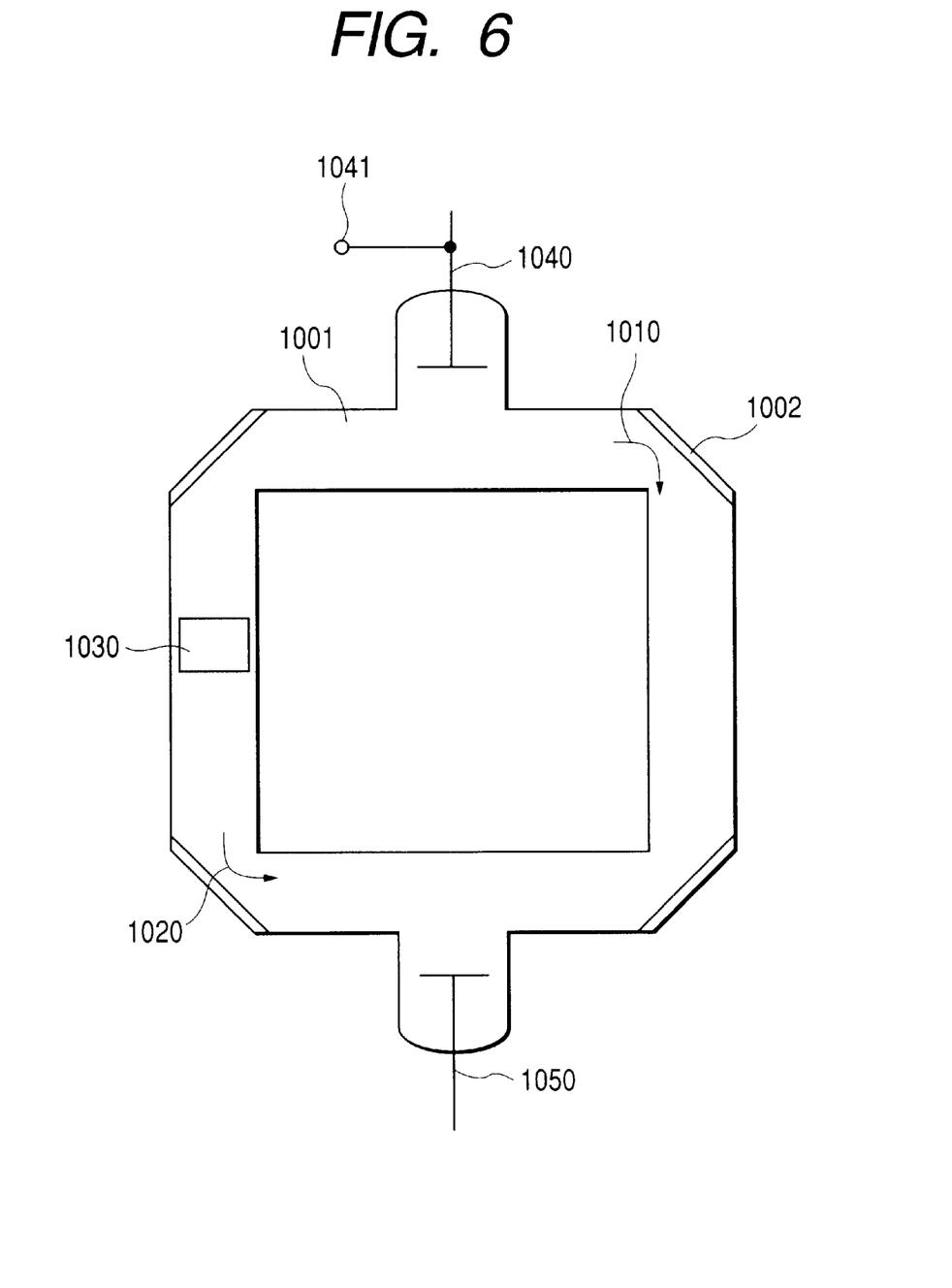
FIG. 6 is a drawing for explaining another gyro according to the first embodiment of the present invention.

Let us next consider an example in which a gas ring laser gyro is used as the gyro 2. FIG. 6 is a drawing schematically showing the gas ring laser gyro, in which reference numeral 1001 designates a silica tube, 1002 mirrors, 1010 a clockwise laser beam, 1020 a counterclockwise laser beam, 1030 an optical isolator, 1040 an anode, 1041 an electric terminal, and 1050 a cathode.

A silica block is first bored with a drill to form a silica tube 1001. After that, the mirrors 1002 are attached to the silica tube 1001. Further, the silica tube 1001 is equipped with the anode 1040, the electric terminal 1041, and the cathode 1050. Then helium gas and neon gas are charged into the silica tube 1001 and a voltage is applied between the anode and the cathode to initiate discharge whereupon an electric current flows. Then the clockwise laser beam 1010 and the counterclockwise laser beam 1020 oscillate in the silica tube 1001.

While this gas ring laser gyro is at a standstill, the oscillation frequencies of the laser beam 1010 and the laser beam 1020 are approximately equal to each other, $4.73 \times 10^{14}$ Hz, and the oscillation wavelength $\lambda$ is 632.8 nm. However, since the optical isolator 1030 is interposed in the optical path of the laser beams, the threshold current for the laser beam 1010 is smaller than that for the laser beam 1020. For this reason, the intensity of the laser beam 1010 is larger than that of the laser beam 1020. As a consequence, the oscillation frequency $f_1$ of the laser beam 1010 becomes 20 MHz larger than the oscillation frequency $f_2$ of the laser beam 1020. Then the laser beams 1010 and 1020 interfere with each other in the silica tube 1001. At this time, the power-source current is controlled at a constant level and the voltage is monitored between the electrode terminal 1041 and the cathode 1050, whereupon a signal having the amplitude of 100 mV and the frequency of 20 MHz is obtained. Namely, the beat frequency can be detected even while the gas ring laser gyro is at a standstill.

When the gas ring laser gyro is subjected to clockwise rotation at the rate of 180 degrees per second and when the length of each side of the resonator is 10 cm, the oscillation frequency $f_1$ of the counterclockwise laser beam 1020 increases by 248.3 kHz. On the other hand, the oscillation frequency $f_2$ of the clockwise laser beam 1010 decreases by 248.3 kHz. Accordingly, the beat frequency becomes as follows.

$$f_1 - f_2 = 20 \text{ MHz} + 496.6 \text{ kHz} \tag{11}$$

When the gas ring laser gyro is subjected to counterclockwise rotation at the rate of 180 degrees per second on the other hand, the beat frequency becomes as follows.

$$f_1 - f_2 = 20 \text{ MHz} - 496.6 \text{ kHz} \tag{12}$$

It is thus feasible to detect the rotational velocity, because the absolute value of the increase/decrease in the beat frequency is proportional to the rotational velocity, and it is also feasible to detect the rotation direction, because the rotation direction and the increase/decrease of the beat frequency are in 1:1 correspondence.

Although the present embodiment was configured to use the constant current driving and measure the change in terminal voltage, it is also possible to detect a change in current flowing at the terminals if the constant voltage driving is employed. It is also possible to directly detect a change in impedance of discharge by an impedance meter.

In this example, the beat frequency at a standstill also fluctuates by about ±100 Hz in the off state of the control apparatus 4. In contrast with it, when the power source 1 is controlled by the control apparatus 4, based on the measurement of the beat frequency, as in the present invention, the frequency fluctuations can be controlled to below ±1 Hz.

Although the terminal voltage was used as the beat signal herein, the signal for detection of angular velocity can also be either of the output signal from the control apparatus 4 and the output current or the output voltage from the power source of driving, which include the information of the beat signal. It is also preferable in terms of improvement in signal/noise ratios to perform the statistical processing to calculate an average (including a weighted average), a difference, etc., using at least two signals selected from those signals.

Although this example used the helium gas and neon gas, the gas may be any gas that can lase. The shape surrounded by the optical path of the optical waveguide does not always have to be rectangular as shown in FIG. 6, either, but may be any shape such as a hexagon, a triangle, a circle, or the like.

The frequency measuring unit 3 will be described below. When the beat signal passes through the frequency-voltage converter (FV converting circuit), the beat frequency can be converted to a voltage. For example, if an offset is adjusted to null the voltage output from the frequency-voltage converter (FV converting circuit) with the gyro 2 being at a standstill, the direction of rotation can be determined based on whether the output of the frequency-voltage converter (FV converting circuit) is positive or negative.

Figure 7:
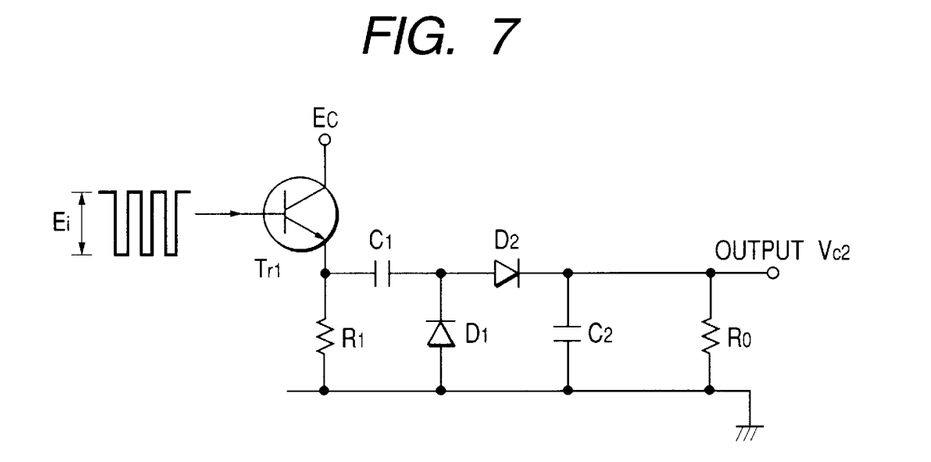
FIG. 7 is a drawing for explaining an FV converting circuit according to the first embodiment of the present invention.

FIG. 7 shows an example of the frequency-voltage converter (FV converting circuit). This circuit is composed of a transistor, diodes, capacitors, and resistors and the output voltage $V_{C2}$ thereof is expressed by the following equation.

$$V_{C2}=E_iC_1R_0f/[1+1/\{1-\exp(-1/R_0C_2f)\}] \quad (13)$$

In this equation, $E_i$ represents a peak-to-peak value of the input voltage and f the beat frequency. When the circuit parameters are designed to satisfy $C_2>>C_1$ and $R_0C_2f<1$, the above equation can be reduced to the following equation.

$$V_{C2}\approx E_iC_1R_0f/2 \quad (14)$$

It is thus feasible to obtain the voltage output proportional to the beat frequency.

Since frequency counters are now commercially available in the form of IC, it is preferable in terms of miniaturization of apparatus to use the frequency counter as the frequency measuring unit 3.

(Second Embodiment)

Figure 8:
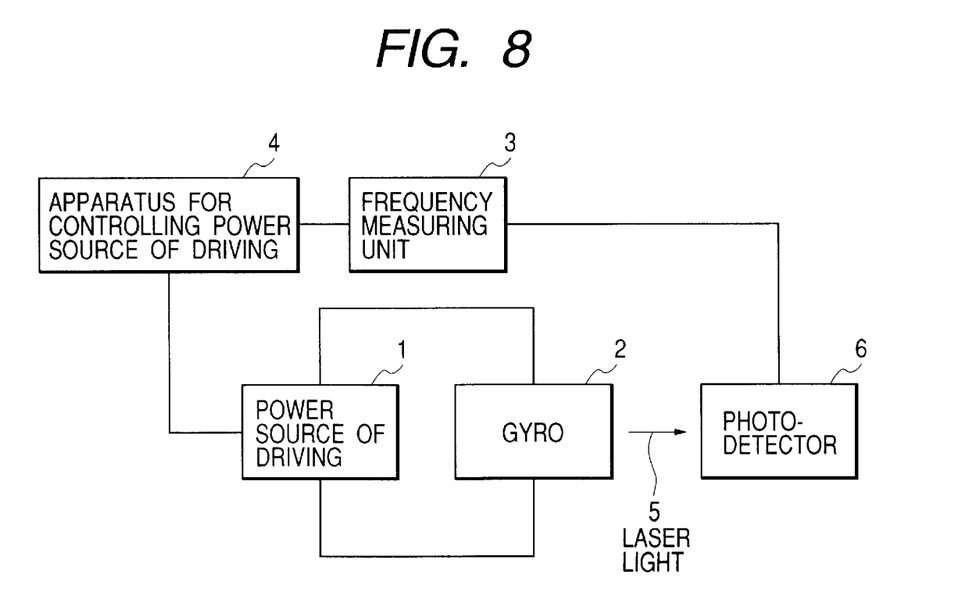
FIG. 8 is a drawing for explaining a gyro according to the second embodiment of the present invention.

FIG. 8 is a drawing illustrating the feature of the second embodiment of the present invention best, in which reference numeral 5 designates laser light emitted from the gyro and 6 a photodetector.

In the above structure, a ring laser gyro is used as the gyro 2. The laser light 5 emitted from the gyro 2 is injected into the photodetector 6. If the laser light 5 is comprised of a clockwise laser beam and a counterclockwise laser beam, beat light appears in the photodetector 6 and the photodetector 6 outputs a signal having the beat frequency. This beat frequency is detected by the frequency measuring unit 3. Then the resultant signal according to the beat frequency is entered into the apparatus 4 for controlling the power source of driving. Finally, the signal is sent from the control apparatus 4 to the power source of driving to stabilize the beat frequency.

First described is an example in which a semiconductor ring laser gyro is used as the gyro 2.

Figure 9A:
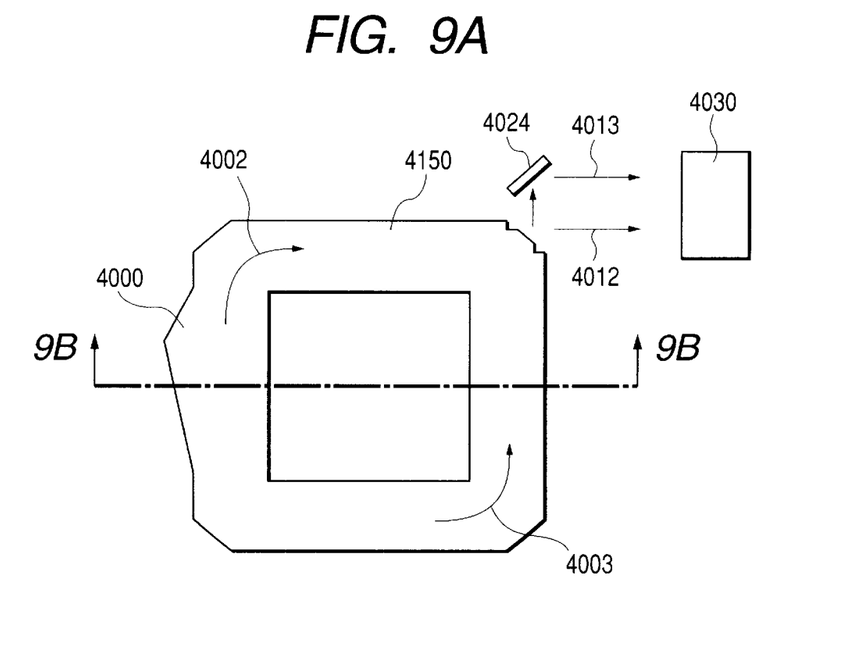
FIGS. 9A and 9B are drawings for explaining the gyro according to the second embodiment of the present invention.
Figure 9B:
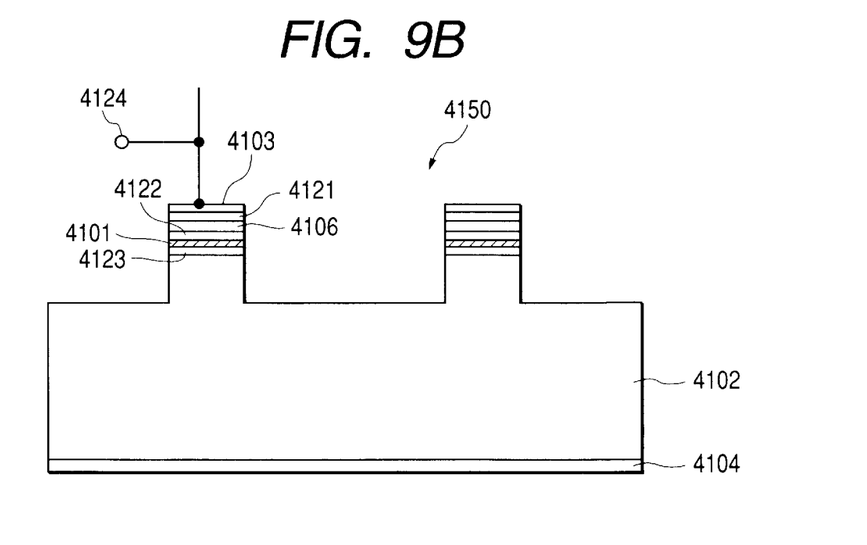

FIGS. 9A and 9B are drawings schematically showing the semiconductor ring laser gyro, which is different from that of FIGS. 2A and 2B in that the gyro has an exit portion of laser light. In the same figures, numeral 4012 represents an emission of a clockwise laser beam, 4013 an emission of a counterclockwise laser beam, 4024 a mirror, and 4030 a photodetector. FIG. 9A is a top plan view of the gyro and FIG. 9B a cross-sectional view of the gyro cut along 9B—9B of FIG. 9A.

In the above structure, since the semiconductors and the air have their respective indexes of refraction different from each other, reflection occurs at the interface between them. Supposing the refractive index of the semiconductors is 3.5, total reflection occurs at angles of not less than 16.6° between the laser light and a normal to the interface. Since the threshold current of a mode undergoing total reflection becomes a mirror loss smaller than that of the other modes, oscillation starts at a lower injection current level. In addition, since the gain is concentrated on this oscillation mode, the oscillation of the other modes is suppressed.

In FIG. 9A, the angles between the laser beams and normals to the interface are 45° at the end facets except for the laser exit portion, which satisfies the total reflection condition. In the laser exit portion part of the end facet is formed so that the laser light is parallel to a normal of the interface. In this configuration, the threshold current at room temperature is 5.5 mA for the laser beam 4002 and 5 mA for the laser beam 4003.

The driving current of the semiconductor ring laser gyro 4150 is 6.5 mA, the oscillation wavelengths of the laser beam 4002 and the laser beam 4003 are approximately equal to each other with this laser being at a standstill, and the oscillation wavelength λ is 1.55 μm. However, the intensity of the laser beam 4003 is larger than that of the laser beam 4002. For this reason, there is a small difference between their oscillation frequencies; the oscillation frequency $f_3$ of the laser beam 4003 is 20 kHz larger than the oscillation frequency $f_4$ of the laser beam 4002. Then the laser beams 4012 and 4013 emitted from the semiconductor ring laser gyro 4150 interfere with each other in the photodetector 4030. At this time, the photodetector 4030 outputs a signal having the frequency of 20 kHz. Namely, the beat signal can be detected even while the semiconductor ring laser gyro 4150 is at a standstill.

Suppose the semiconductor ring laser gyro 4150 is subjected to clockwise rotation at the rate of 30 degrees per second, which is close to hand shakes of cameras and vibration of cars. Then the oscillation frequency $f_3$ of the counterclockwise laser beam 4003 increases by 88.7 Hz. On the other hand, the oscillation frequency $f_4$ of the clockwise laser beam 4002 decreases by 88.7 Hz. Therefore, the beat frequency turns as follows.

$$f_3-f_4=20\text{ kHz}+177.4\text{ Hz} \quad (15)$$

If the semiconductor ring laser gyro 4150 is subjected to counterclockwise rotation at the rate of 30 degrees per second on the other hand, the beat frequency turns as follows.

$$f_3-f_4=20\text{ kHz}-177.4\text{ Hz} \quad (16)$$

It is feasible to detect the rotational velocity, because the absolute value of the increase/decrease in the beat frequency is proportional to the rotational velocity, and it is also feasible to detect the direction of rotation, because the rotation direction and the increase/decrease in the beat frequency are in 1:1 correspondence.

Although it was described heretofore that the beat frequency at a standstill was 20 kHz, the beat frequency at a standstill demonstrates fluctuations of ±50 Hz in the off state of the control apparatus 4, as shown in FIG. 5A. In contrast with it, where the power source 1 is controlled by the control apparatus 4, based on the measurement of the beat frequency, as in the present invention, the beat frequency becomes stabilized as shown in FIG. 5B. FIG. 5C shows a spectrum on a scale enlarged from the ordinate of FIG. 5B and it is seen therefrom that the frequency fluctuations are controlled to below ±1 Hz.

Although the output signal from the photodetector was used as the beat signal herein, the signal for detection of angular velocity can also be either of the output signal from the control apparatus 4 and the output current or the output voltage from the power source of driving, which include the information of the beat signal. It is also preferable in terms of improvement in signal/noise ratios to perform the statistical processing to calculate an average (including a weighted average), a difference, etc., using at least two signals selected from those signals and the signal from the electric terminals of the gyro.

Although the semiconductor materials used herein were the InGaAsP based materials, they can be any semiconductor materials such as GaAs based, ZnSe based, InGaN based, AlGaN based, and other materials. The shape surrounded by the optical path of the optical waveguide does not always have to be rectangular as shown in FIG. 2A, but may also be any shape such as a hexagon, a triangle, a circle, or the like.

Let us next consider an example in which a gas ring laser gyro is used as the gyro 2.

Figure 10:
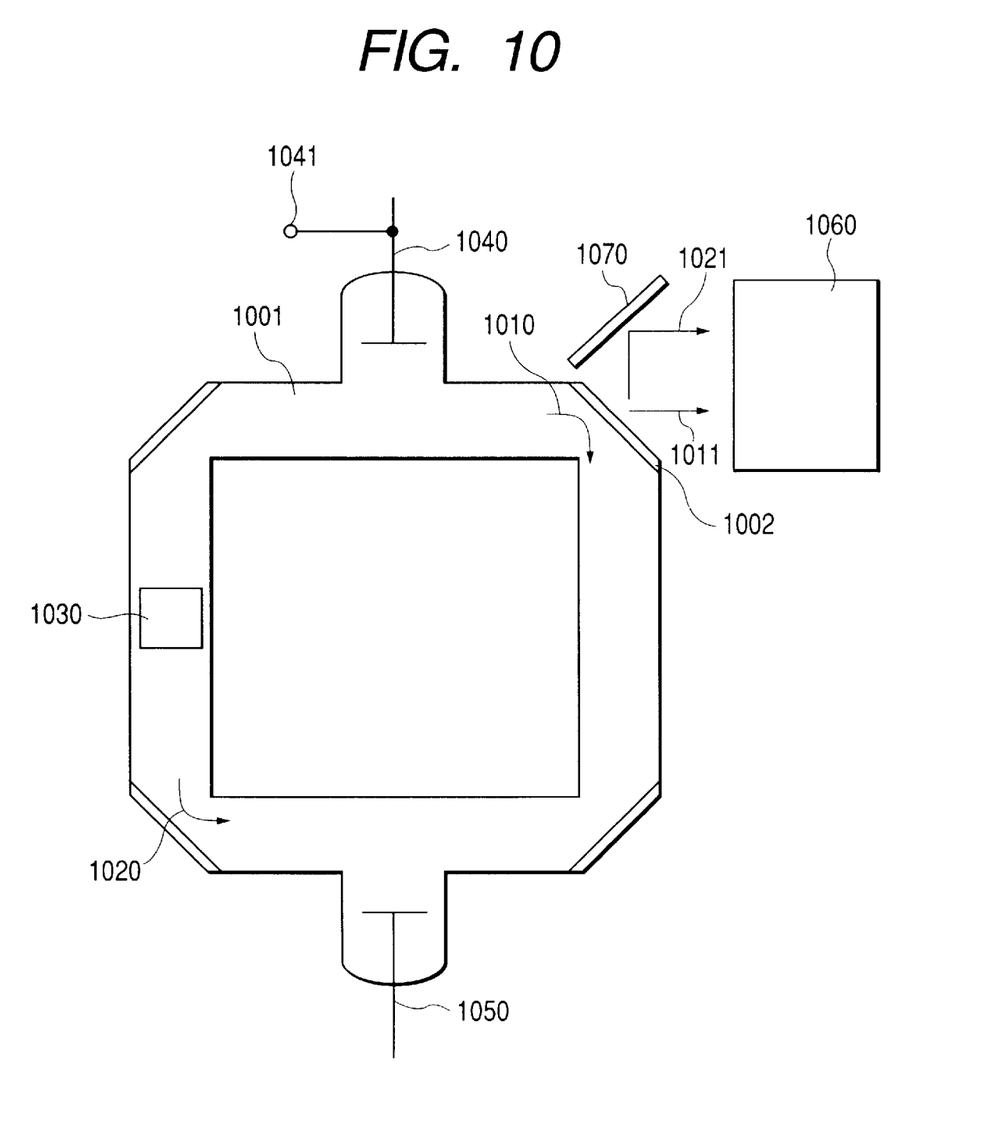
FIG. 10 is a drawing for explaining another gyro according to the second embodiment of the present invention.

FIG. 10 is a drawing schematically showing the gas ring laser gyro, in which reference numeral 1011 represents an emission of a clockwise laser beam, 1021 an emission of a counterclockwise laser beam, 1060 a photodetector, and 1070 a mirror. Helium gas and neon gas are charged into the silica tube 1001 and a voltage is applied between the anode and the cathode to initiate discharge whereupon an electric current flows. Then the clockwise laser beam 1010 and the counterclockwise laser beam 1020 oscillate in the silica tube 1001.

While this gas ring laser gyro is at a standstill, the oscillation frequencies of the laser beam 1010 and the laser beam 1020 are approximately equal to each other, $4.73 \times 10^{14}$ Hz, and the oscillation wavelength $\lambda$ is 632.8 nm. However, since the optical isolator 1030 is interposed in the optical path of the laser beams, the threshold current for the laser beam 1010 is smaller than that for the laser beam 1020. For this reason, the intensity of the laser beam 1010 is larger than that of the laser beam 1020. As a consequence, the oscillation frequency $f_1$ of the laser beam 1010 becomes 20 MHz larger than the oscillation frequency $f_2$ of the laser beam 1020. Then these laser beams are emitted outward and the laser beams 1011 and 1021 are simultaneously injected into the photodetector 1060. Then the laser beams 1011 and 1021 interfere with each other in the photodetector 1060, so that the photodetector 1060 outputs the signal having the frequency of 20 MHz. Namely, the beat frequency can be detected even while the gas ring laser gyro is at a standstill.

When the gas ring laser gyro is subjected to clockwise rotation at the rate of 180 degrees per second and when the length of each side of the resonator is 10 cm, the oscillation frequency $f_1$ of the counterclockwise laser beam 1020 increases by 248.3 kHz. On the other hand, the oscillation frequency $f_2$ of the clockwise laser beam 1010 decreases by 248.3 kHz. Accordingly, the beat frequency becomes as follows.

$$f_1-f_2=20 \text{ MHz}+496.6 \text{ kHz} \tag{17}$$

When the gas ring laser gyro is subjected to counterclockwise rotation at the rate of 180 degrees per second on the other hand, the beat frequency becomes as follows.

$$f_1-f_2=20 \text{ MHz}-496.6 \text{ kHz} \tag{18}$$

It is thus feasible to detect the rotational velocity, because the absolute value of the increase/decrease in the beat frequency is proportional to the rotational velocity, and it is also feasible to detect the rotation direction, because the rotation direction and the increase/decrease in the beat frequency are in 1:1 correspondence.

In this example, the beat frequency at a standstill also fluctuates by about ±100 Hz in the off state of the control apparatus 4. In contrast with it, when the power source 1 is controlled by the control apparatus 4, based on the measurement of the beat frequency, as in the present invention, the frequency fluctuations can be controlled to below ±1 Hz.

The signal for detection of angular velocity can also be either of the output signal from the control apparatus 4 and the output current or the output voltage from the power source of driving, which include the information of the beat signal. It is also preferable in terms of improvement in signal/noise ratios to perform the statistical processing to calculate as an average (including a weighted average), a difference, etc., using at least two signals selected from those signals and the signal from the electric terminals of the gyro.

Although this example used the helium gas and neon gas, the gas may be any gas that can lase. The shape surrounded by the optical path of the optical waveguide does not always have to be rectangular as shown in FIG. 10, but may be any shape such as a hexagon, a triangle, a circle, or the like.

According to the present invention, as detailed above, the angular velocity of rotation and the direction of rotation can be detected accurately and stably. Since the beat also occurs in the non-rotating state, it is feasible to realize the optical gyro without lock-in.

What is claimed is:

1. A gyro apparatus comprising a ring laser in which laser beams of different oscillation frequencies coexist and propagate in mutually opposite circulation directions in an optical resonator, a power source for driving the ring laser, a device for measuring a difference between the oscillation frequencies of the laser beams, and a device for controlling said power source for driving to maintain a constant difference between the oscillation frequencies.

2. The gyro apparatus according to claim 1, wherein said device for measuring the difference between the oscillation frequencies of the laser beams measures a change in current, voltage, or impedance of said ring laser.

3. The gyro apparatus according to claim 1, further comprising a photodetector for simultaneously receiving the laser beams circulating in the mutually opposite directions in the optical resonator, wherein said device for measuring the difference between the oscillation frequencies of the laser beams receives an output of said photodetector.

4. The gyro apparatus according to claim 1, further comprising a photodetector for simultaneously receiving the laser beams circulating in the mutually opposite directions in said optical resonator, wherein said device for measuring the difference between the oscillation frequencies of the laser beams measures a change in current, voltage, or impedance of said ring laser, and receives an output of said photodetector.

5. The gyro apparatus according to any one of claims 1 to 4, wherein said ring laser comprises an optical waveguide, at least part of which has an asymmetric taper shape.

6. The gyro apparatus according to any one of claims 1 to 4, wherein said ring laser comprises an optical element for providing a difference in optical intensity to the laser beams propagating in the mutually opposite circulation directions.

7. The gyro apparatus according to any one of claims 1 to 4, said gyro apparatus further comprising a frequency-voltage converter.

8. The gyro apparatus according to any one of claims 1 to 4, said gyro apparatus further comprising a frequency counter.

9. The gyro apparatus according to claim 1, wherein, while said gyro apparatus is under rotation, said power source for driving is controlled so as to maintain a constant difference between the oscillation frequencies of the laser beams, and an angular velocity is detected from a control signal.

10. A method of driving a gyro apparatus, wherein, while the gyro apparatus as set forth in any one of claims 1 to 4 is at a standstill, the power source for driving is controlled so as to maintain a constant difference between the oscillation frequencies of the laser beams.

11. A method of driving a gyro apparatus, wherein, while the gyro apparatus as set forth in any one of claims 1 to 4 is under rotation, the power source for driving is controlled so as to maintain a constant difference between the oscillation frequencies of the laser beams.

12. The method according to claim 10, wherein an output voltage or an output current from the power source for driving is decreased as the frequency difference increases, and the output voltage or the output current from the power source for driving is increased as the frequency difference decreases.

13. A signal detecting method for a gyro apparatus as set forth in any one of claims 1 to 4, wherein at least one of a change in current, voltage, or impedance of the ring laser, an output of the photodetector, a signal for control of the power source for driving, and an output current or an output voltage of the power source for driving is used as an output signal of the gyro.

14. The signal detecting method according to claim 13, wherein a plurality of signals out of the change in current, voltage, or impedance of the ring laser, the output of the photodetector, the signal for control of the power source for driving, and the output current or the output voltage of the power source for driving are subjected to statistical processing to be used as an output signal of the gyro.

15. The method according to claim 11, wherein an output voltage or an output current from the power source for driving is decreased as the frequency difference increases, and the output voltage or the output current from the power source for driving is increased as the frequency difference decreases.

* * * * *

UNITED STATES PATENT AND TRADEMARK OFFICE
CERTIFICATE OF CORRECTION

PATENT NO. : 6,603,113 B2
DATED : August 5, 2003
INVENTOR(S) : Numai

It is certified that error appears in the above-identified patent and that said Letters Patent is hereby corrected as shown below:

Column 3,
Line 14, "L)" should read -- $L_1$) --.

Signed and Sealed this

Seventh Day of September, 2004

JON W. DUDAS
*Director of the United States Patent and Trademark Office*